Figure 1:
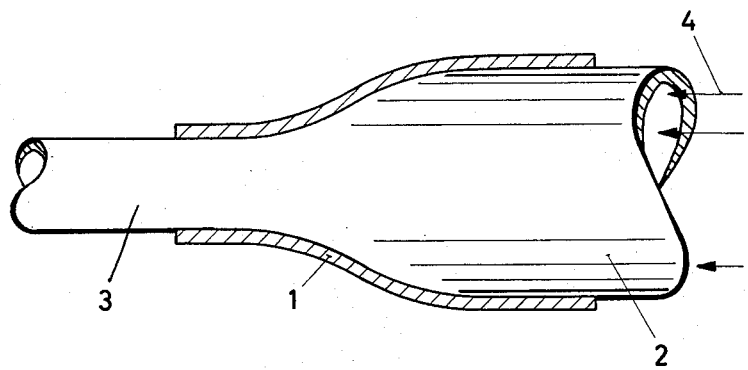

May 11, 1965  D. JENTZSCH  3,182,394
METHOD OF MAKING CAPILLARY COLUMNS
Filed Oct. 1, 1962

DIETRICH JENTZSCH,
*INVENTOR.*

BY *Daniel R Levinson*

3,182,394
METHOD OF MAKING CAPILLARY COLUMNS
Dietrich Jentzsch, Uberlingen (Bodensee), Germany, assignor to Bodenseewerk Perkin-Elmer & Co. G.m.b.H., Uberlingen (Bodensee), Germany
Filed Oct. 1, 1962, Ser. No. 227,350
Claims priority, application Germany, Oct. 4, 1961, B 64,235
8 Claims. (Cl. 29—460)

This invention relates to a technique for making capillary columns for gas chromatography.

As is well known, gas chromatography is a method of separating gas or low-boiling-point liquid mixtures. In this technique, a measured gaseous sample of the mixture is transported through a separating column by means of an inert carrier gas. The column contains a substance which has a strong affinity for the various components of the mixture sample. Because of the fact that the various components in the sample have somewhat different affinity for the separating substance, the different components will appear at the exit end of the column at different times. Therefore, the originally uniform mixture becomes a series of component "packets" by the time they reach the other end of the column. By recording the quantity and time of arrival of the various component "packets" at the column exit, one may analyze the original mixture both qualitatively and quantitatively.

In many early separating columns the separating substance or stationary phase was a liquid applied to a suitable carrier or substrate. This stationary phase however, can be a solid instead. For example, so called "molecular sieves" are preferably used for the separation of such relatively insoluble gases as nitrogen ($N_2$), oxygen ($O_2$) and the like. In this latter type of column, a solid granular substance, such as silica gel, is used to adsorb the various sample components differentially. This "molecular sieve" type of column is capable of separating the above-mentioned mixture components, which are not separable by the usual distribution chromatography techniques utilizing a liquid as the separating stationary phase.

In addition to the above type of columns there have been developed the so called "packed columns." In these, the separating columns or tubes are usually completely filled with a granular inert carrier or substrate material (e.g. brick powder), wetted with a liquid separating substance. Alternatively, this type of column may be filled with a granular "molecular sieve" material.

Recently a further type of column has been developed: the so-called capillary or Golay column. In these small diameter columns, a liquid separating substance is applied to the inside wall of the capillary tubing. These Golay columns have a substantially improved separating capacity is compared to packed columns and also have greater resolution. Thus, the component "packets" are more sharply defined at the exit end of the column, since the adverse effect of both inhomogeneous packing and diffusion of the sample components in the stationary solid substrate or carrier material are eliminated. Additionally, since the flow resistance of the column per unit length is decreased, Golay columns may be made much longer then packed columns (for example, more than ten meters long).

Various techniques have been utilized for applying the separating material on the inside wall of the capillary column. All of these previous techniques, however, are based on the use of a separating substance which is either liquid or else dissolved in a solvent so as to be introduced into the capillary in a liquid state. Until the development of the present invention, no practical technique for applying insoluble, refractory solid material (to make a molecular sieve type of separator) to the capillary column interior wall has been available. For this reason the Golay column has not previously been adapted for the separation of the type of inert gases mentioned above.

A main object of the inventoin is the provision of a gas chromatography column combining the advantages of the capillary Golay column and the use of solid molecular sieve separating material.

A further object of the invention is the provision of a Golay or capillary column containing solid, relatively insoluble material on its inside walls.

Another object of the invention is the provision of a Golay column in which the separating liquid has an increased effective area per unit length of tube.

Figure 2:
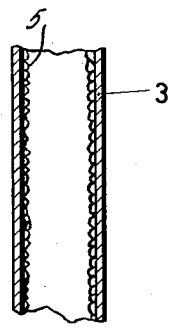

One common method for forming the capillary columns themselves is to draw a larger diameter tube (usually, metallic) by means of a suitable drawing nozzle. By this means, a very fine metallic capillary tube may be produced. The invention provides the interior of such a capillary tube with embedded granular material, which may be utilized as either the separating substance itself or a carrier therefor. The specific manner in which the granular material is so embedded, will be more readily understood upon reading the following specific disclosure in conjunction with the accompanying drawing, in which:

FIG. 1 is a partially schematic, partially sectionalized side elevation of the drawing of a capillary tube according to the invention; and FIG. 2 is a vertical section through a completed capillary tube column, showing the granular material embedded in the inside wall thereof.

In FIG. 1 a conventional drawing nozzle 1 is shown in use. A metallic tube 2 (which may be, for example, copper) is introduced in to the right-hand side of the nozzle and is drawn at controlled elevated temperature from the narrower left-hand side as a fine capillary tube 3. This part of the drawing separation is well-known and is therefore not described in complete detail.

The invention consists in introducing into the right-hand end of the copper tube 2 the granular material (for example, silica gel) during the drawing operation. The introduction of this solid material is schematically represented by arrows 4. By controlling the rate of introduction of this material and the temperature, rate and other conditions of the drawing operation, the granular material is caused to be embedded in the softened, partly molten wall of the emerging capillary tube 3. The depth of this embedding will be a function of the temperature and rate of drawing, so as to be readily controllable.

Thus, the finished capillary tube shown in FIG. 2 has the granular material embedded all along the inside wall thereof, as shown at 5. This capillary tube may be then utilized as a Golay column having a molecular sieve stationary phase, or alternatively the embedded solid material (such as silica gel) may be used as a carrier for a liquid stationary phase. Particularly for capillary columns of comparatively large diameter (e.g., 0.5 or 1 mm.), the use of a granular carrier substrate and a liquid separating coating has the advantage of increasing the capacity of the column by increasing the surface area utilized per unit length.

The invention, therefore, makes available for the first time, a molecular sieve type of Golay column (for separating so-called inert gases), and in addition allows the use of somewhat shorter and/or larger diameter capillary tubes if a liquid stationary phase type of capillary column is made therefrom.

I claim:
1. In a method for producing capillary columns useful for gas chromatography, wherein a larger diameter tubing is drawn to form a small diameter capillary tube, the improvement which comprises:
   introducing into the larger diameter tubing a solid granular material prior to and during the drawing process;
   and controlling the rate of such introduction, the temperature, and the rate of drawing of the capillary tube in such a manner as to cause the granular material to become at least partially embedded in the interior wall of said capillary tube.
2. The method according to claim 1, in which:
   said larger diameter tubing, and therefore said small diameter capillary tube, is essentially composed of metal.
3. The method according to claim 2, in which:
   said metal comprises a substantial proportion of copper.
4. The method according to claim 1, in which:
   said solid granular material is suitable for forming a molecular sieve type of adsorption layer on the interior walls of the capillary tube.
5. The method according to claim 1, in which:
   said solid granular material is suitable for use as a substrate carrier substance for supporting as a coating the liquid stationary phase of the column.
6. The method according to claim 5, in which:
   said solid granular material comprises silica gel.
7. In a method for producing capillary columns useful for gas chromatography, wherein a larger diameter tubing is drawn to form a small diameter capillary tube, the improvement which comprises:
   introducing into the larger diameter tubing a solid granular material prior to and during the drawing process;
   controlling the rate of said introduction, the temperature, and the rate of drawing of the capillary tube in such a manner as to cause the granular material to become at least partially embedded in the interior wall of said capillary tube;
   and subsequently coating said embedded granular material with a liquid, suitable for acting as the stationary phase of a gas chromatographic column.
8. The method according to claim 7, in which:
   said solid granular material comprises silica gel.

References Cited by the Examiner
UNITED STATES PATENTS

| | | | |
|---|---|---|---|
| 982,751 | 1/11 | Thowless | 205—19 |
| 1,662,506 | 3/28 | Mansfield | 80—62 |

CHARLES W. LANHAM, *Primary Examiner.*